United States Patent
Walenta et al.

(10) Patent No.: US 8,177,903 B2
(45) Date of Patent: May 15, 2012

(54) HYDRAULIC BINDER WITH A BASE OF SULFOALUMINATE CLINKER AND PORTLAND CLINKER

(75) Inventors: Günther Walenta, Genas (FR); Cédric Comparet, Optevoz (FR); Vincent Morin, Lyons (FR); Ellis Gartner, Lyons (FR)

(73) Assignee: Lafarge, Paris (FR)

( * ) Notice: Subject to any disclaimer, the term of this patent is extended or adjusted under 35 U.S.C. 154(b) by 0 days.

(21) Appl. No.: 13/140,578

(22) PCT Filed: Dec. 18, 2009

(86) PCT No.: PCT/FR2009/001456
§ 371 (c)(1),
(2), (4) Date: Jun. 30, 2011

(87) PCT Pub. No.: WO2010/070214
PCT Pub. Date: Jun. 24, 2010

(65) Prior Publication Data
US 2011/0259247 A1  Oct. 27, 2011

(30) Foreign Application Priority Data

Dec. 19, 2008 (FR) ..................... 08/07182
Jan. 23, 2009 (FR) ..................... 09/00291

(51) Int. Cl.
*C04B 7/32* (2006.01)
*C04B 28/06* (2006.01)
*C04B 28/02* (2006.01)

(52) U.S. Cl. ......... 106/695; 106/692; 106/693; 106/694

(58) Field of Classification Search .............. 106/692, 106/693, 694, 695
See application file for complete search history.

(56) References Cited

U.S. PATENT DOCUMENTS

| | | | |
|---|---|---|---|
| 3,801,338 A | 4/1974 | Whitaker | |
| 4,318,744 A | 3/1982 | Dodson | |
| 4,373,956 A | 2/1983 | Rosskopf | |
| 5,017,234 A | 5/1991 | Gartner et al. | |
| 6,695,910 B2 * | 2/2004 | Classen et al. | 106/739 |
| 7,850,776 B2 * | 12/2010 | Gartner et al. | 106/692 |
| 7,998,267 B2 * | 8/2011 | Gartner et al. | 106/692 |
| 2007/0266903 A1 | 11/2007 | Gartner | |

FOREIGN PATENT DOCUMENTS

| | | |
|---|---|---|
| FR | 2 873 366 | 1/2006 |
| FR | 2940274 A1 * | 6/2010 |
| FR | 2940275 A1 * | 6/2010 |
| WO | WO 99/02465 | 1/1999 |
| WO | WO 03/054346 | 7/2003 |
| WO | WO 2006/018569 | 2/2006 |

OTHER PUBLICATIONS

Majling J et al: "Generalized Bogue Computations to Forecast the Mineralogical Composition of Sulfoaluminate Cements Based on Fly Ashes"; Advances in Cement Research, London, GB, vol. 11, No. 1, Jan. 1, 1999, pp. 27-34.
Mehta P K: "Investigations on Energy-Saving Cements"; World Cement Technology, Cement and Concrete Association, London, GB, May 1, 1980, pp. 166-177.
Beretka J et al: "Influence of C4A3S{content and W/S ratio on the performance of calcium sulfoaluminate-based cements"; Cement and Concrete Research, Pergamon Press, Elmsford, NY, US, vol. 26, No. 11, Nov. 1, 1996, pp. 1673-1681.
Arjunan P et al: "Sulfoaluminate-belite cement from low-calcium fly ash and sulfur-rich and other industrial by-products"; Cement and Concrete Research, Pergamon Press, Elmsford, NY, US, vol. 29, No. 8, Jan. 1, 1999, pp. 1305-1311.
Glasser F P et al: "High-performance cement matrices based on calcium sulfoaluminate-belite compositions" Cement and Concrete Research, Pergamon Press, Elmsford, NY, US, vol. 31, No. 12, Dec. 1, 2001, pp. 1881-1886.
Woo-Hyeong Chae: "Early Hydratation of modified Belite Cement prepared by adding Borax" The Korean Journal of Chemistry 2 (3);pp. 147-151, (1996).
Zhang Jusong et al.: "The influence of TiO2 on the formation of Belite-Calcium Sulfoaluminate Cement" Cement Guide for New Epoch No. 3, pp. 17-19, (2002).
Kuroda T "Cement compositions" Chemical Abstract; 6001 Chemical Abstracts 107,, Sep. 7, 1987; No. 10, p. 315, Columbus Ohio, US.

* cited by examiner

*Primary Examiner* — Anthony J Green
(74) *Attorney, Agent, or Firm* — Pillsbury Winthrop Shaw Pittman, LLP

(57) ABSTRACT

The present invention relates to a composition including at least a Portland clinker and a Belite-Calcium-Sulphoaluminate-Ferrite clinker (BCSAF).

21 Claims, No Drawings

HYDRAULIC BINDER WITH A BASE OF SULFOALUMINATE CLINKER AND PORTLAND CLINKER

CROSS-REFERENCE TO RELATED APPLICATIONS

This is the U.S. National Stage of PCT/FR2009/001456, filed Dec. 18, 2009, which in turn claims priority to French Patent Application No. 08/07182, filed Dec. 19, 2008 and to French Patent Application No. 09/00291, filed Jan. 23, 2009, the entire contents of all applications are incorporated herein by reference in their entireties.

The present invention relates to a composition comprising at least a sulfoaluminate clinker and a Portland clinker, to its process of production, and to its use for the preparation of hydraulic binders.

Most modern concretes are made with hydraulic cements generally obtained from clinkers. Portland clinker is produced by heating a fine and intimate mixture comprising for example limestone, clay, silica and iron ore, to a temperature generally higher than 1350° C. in a rotary kiln. After calcination of the mix, the clinker takes the form of hard nodules which, after cooling, are ground with calcium sulphates and other mineral additions to form Portland cement. A very high content of limestone is necessary in the mix of raw materials introduced into the kiln, in order to obtain a clinker having alite as its main mineral phase. Alite is an impure form of calcium trisilicate, $Ca_3SiO_5$, for which the conventional notation is $C_3S$. A high content of alite, generally greater than 50% by mass percentage, is indispensable in the mineralogical composition of modern cements, because this is what allows the strength properties to develop rapidly just after setting, and allows the strength properties at 28 days and over to develop sufficiently, in order to meet the specifications of most cement standards in this area. For the remaining of the description of the invention, the following abbreviated notations will be used, unless explicitly stated otherwise, to designate the mineralogical components of the cement:

C represents CaO (lime),
A represents $Al_2O_3$ (alumina),
F represents $Fe_2O_3$,
S represents $SiO_2$ (silica),
$ represents $SO_3$,
H represents $H_2O$ (water).

The production of Portland clinker releases carbon dioxide in the atmosphere. The cement industry is indeed responsible for approximately 5% of industrial emissions of $CO_2$. These $CO_2$ emissions in the production of Portland clinker could reduced by approximately 10% if the alite were almost totally eliminated. This could be done if the quantity of limestone introduced in the kiln were reduced by 10%; the quantity of $CO_2$ related to the decarbonation of the limestone during the calcination would be reduced, as well as the amount of fuel needed to supply the energy required to decarbonate the limestone. This would be accompanied by a reduction of the temperature of the kiln, making it possible to save energy, and hence, save costs in the production of clinker.

However, the reduction of the alite during the production of Portland clinkers does not make it possible to obtain clinkers producing cements with satisfactory mechanical strengths. Clinkers with low contents of alite produce cements with short-term mechanical strengths which do not meet standard requirements and do not achieve the performances required for current modern concrete applications.

With the aim of developing marketable cements for which the production is associated with low industrial emissions of $CO_2$, it has become necessary to find another means of producing a clinker with a low emission level of CO2.

Therefore the problem that the invention intends to solve is to provide a new clinker.

Unexpectedly, the inventors have shown that it is possible to mix Portland clinkers with a clinker without alite, optionally with a very low content of alite, whilst retaining and/or increasing the mechanical strengths, in particular, short-term mechanical strengths.

With this aim the present invention provides a composition comprising at least, in % expressed by mass relative to the total mass of the composition, from 1 to 99% of a Portland clinker or Portland cement; and
from 99 to 1% of a Belite-Calcium-Sulphoaluminate-Ferrite clinker (BCSAF) comprising at least, in % expressed by mass relative to the total mass of BCSAF clinker
from 5 to 30%, of a calcium aluminoferrite phase of a composition corresponding to the general formula $C_2A_xF_{(1-x)}$, wherein X is from 0.2 to 0.8;
from 10 to 35%, of a calcium sulfoaluminate phase <<ye'elimite>> ($C_4A_3$$),
from 40 to 75% of belite ($C_2S$),
from 0.01 to 10% of one or more minor phases selected from calcium sulphates, alkali sulphates, perovskite, gehlenite, free lime and periclase, and/or a vitreous phase,
and for which the total of the percentages of these phases is greater than or equal to 97%.

The invention also relates to a cement comprising at least a composition as hereinbefore described; and
from 1 to 40% of calcium sulphate, % by mass relative to the total mass of cement.

The invention also relates to a concrete comprising at least a cement as hereinbefore described.

Finally, the invention also relates to a process for the preparation of a concrete according to the invention comprising a step of mixing a cement according to the invention with aggregates, water, optionally additives, and optionally mineral additions.

The invention offers at least one of the determining advantages described hereinbelow.

Advantageously, the hydraulic binders according to the invention have high short-term mechanical strengths, in particular after 24 hours.

The invention has another advantage in that the compositions according to the invention may be produced in conventional rotary kilns and/or different kilns.

Finally, the invention has the advantage of being able to be used in all industries, in particular the construction industry, the cement industry and in all construction markets (buildings, civil engineering, pre-cast plants).

Other advantages and characteristics of the invention will clearly appear after reading the following description and examples provided for non-limiting illustration purposes.

The expression <<hydraulic binder>>, is to be understood according to the present invention as any compound which has the property of becoming hydrated in the presence of water and the hydration of which makes it possible to obtain a solid having mechanical characteristics. The hydraulic binder according to the invention may in particular be a cement.

The term <<concrete>>, is to be understood as a mix of hydraulic binders, aggregates, water, optionally additives, and optionally mineral additions, for example high performance concrete, very high performance concrete, self-placing concrete, self-levelling concrete, self-compacting concrete, fibre concrete, ready-mix concrete or coloured concrete. The term <<concrete>>, is also to be understood as concretes having been submitted to a finishing operation, for example bush-hammered concrete, exposed or washed concrete or polished concrete. Pre-stressed concrete is also to be understood by this definition. The term <<concrete>> comprises mortars, in this specific case concrete comprises a mix of hydraulic binder, sand, water and optionally additives and optionally mineral additions. The term <<concrete>> according to the invention denotes indistinctly fresh concrete or hardened concrete.

The term <<aggregates>> is to be understood according to the invention as gravel, fine gravel and/or sand of lightweight aggregates and/or artificial aggregates.

The expression <<mineral additions>>, is to be understood according to the invention as slags (as defined in the <<Cement>> NF EN 197-1 Standard, paragraph 5.2.2), steel industry slags, pozzolanic materials (as defined in the <<Cement>> NF EN 197-1 Standard, paragraph 5.2.3), fly ash (as defined in the <<Cement>> NF EN 197-1 Standard, paragraph 5.2.4), calcined shale (as defined in the <<Cement>> NF EN 197-1 Standard, paragraph 5.2.5), limestones (as defined in the <<Cement>> NF EN 197-1 Standard, paragraph 5.2.6), or silica fume (as defined in the <<Cement>> NF EN 197-1 Standard, paragraph 5.2.7) or mixtures thereof.

The expression <<Portland cement>>, is to be understood according to the invention as a cement of type CEM I, CEM II, CEM III, CEM IV or CEM V according to the NF EN 197-1 <<Cement>> Standard.

The expression <<Portland clinker>>, is to be understood according to the invention as a clinker as defined by the NF EN 197-1 <<Cement>> Standard.

The term <<feldspars>>, is to be understood according to the invention as a mineral with a double base of potassium aluminosilicate, sodium aluminosilicate or calcium aluminosilicate. The feldspars are in the tectosilicate family. Many feldspars exist, the main feldspars are potassic orthoclase, sodic albite and calcic anorthite. The mix of the latter two provides the series of plagioclases.

The term <<clinker>>, is to be understood according to the invention as the product obtained after burning (clinkerisation) of a mix (raw meal) composed, among others for example of limestone and for example clay.

The expression <<BCSAF cement>>, is to be understood according to the invention as a cement comprising at least one BCSAF clinker and at least one source of calcium sulphate.

The expression <<BCASF clinker>>, is to be understood according to the invention as a clinker which may be obtained according to the process described in patent application WO 2006/018569 or a clinker comprising at least, in % expressed by mass relative to the total mass of the BCSAF clinker,
from 5 to 30%, of a calcium aluminoferrite phase of a composition corresponding to the general formula $C_2A_xF_{(1-x)}$, wherein X is from 0.2 to 0.8;
from 10 to 35%, of a calcium sulfoaluminate phase <<ye'elimite>> ($C_4A_3\$$),
from 40 to 75% of belite ($C_2S$),
from 0.01 to 10% of one or more minor phases selected from calcium sulphates, alkali sulphates, perovskite, gehlenite, free lime and periclase, and/or a vitreous phase,
and for which the total of the percentages of these phases is greater than or equal to 97%.

The term <<phase>>, is to be understood according to the invention as a mineralogical phase.

The term <<element>>, is to be understood according to the invention as a chemical element according to the Periodic Table of Elements.

The following terms, are to be understood according to the invention:
$C_3S$: impure tricalcium silicate ($Ca_3SiO_5$): (Alite) $3(CaO).(SiO_2)$
$C_2S$: impure dicalcium silicate ($Ca_2SiO_4$): (Belite) $2(CaO).(SiO_2)$
$C_3A$: Tricalcium aluminate ($Ca_3Al_2O_6$): (Aluminate) $3(CaO).(Al_2O_3)$
$C_4AF$: Tetracalcium-aluminateferrite ($Ca_4Al_2Fe_2O_{10}$): (Ferrite or aluminoferrite or brownmillerite) $4(CaO).(Al_2O_3).(Fe_2O_3)$, or more generally a compound of the general formula $2(CaO).(Al_2O_3).(1-x)(Fe_2O_3)$ wherein X is from 0.2 to 0.8
$C_4A_3\$$: calcium sulfoaluminate <<ye'elimite>> $4(CaO).3(Al_2O_3).(SO_3)$
Limestone: $CaCO_3$
Gypsum: $CaSO_4.2(H_2O)$;
Calcium sulphate hemihydrate: $CaSO_4.0.5H_2O$;
Anhydrous calcium sulphate: $CaSO_4$;
Periclase: $MgO$;
Sand, silica: $SiO_2$.

The term <<clay>>, is to be understood according to the present invention as a sedimentary rock, for a large part composed of specific minerals, silicates, generally of more or less hydrated aluminium, which have a layer structure (phyllosilicates), or a fibrous structure (sepiolite and palygorskite).

The term <<setting>>, is to be understood according to the present invention as the passage to the solid state by chemical hydration reaction of the binder. The setting is generally followed by a hardening period.

The term <<hardening>>, is to be understood according to the present invention as the acquisition of mechanical properties of a hydraulic binder, after the end of the setting phase.

The expression <<elements for the construction field>>, is to be understood according to the present invention as any element being part of a construction, for example a floor, a screed, a foundation, a wall, a partition wall, a ceiling, a beam, a work top, a pillar, a bridge pier, a concrete block, a pipe, a post, a cornice, an element of road works (for example a border of a pavement) a roof tile, an element of drainage canalisations.

First of all the present invention relates to a composition comprising at least, in % expressed by mass relative to the total mass of the composition,
from 1 to 99% of a Portland clinker or Portland cement; and
from 99 to 1% of a Belite-Calcium-Sulphoaluminate-Ferrite clinker (BCSAF) comprising at least, in % expressed by mass relative to the total mass of BCSAF clinker
from 5 to 30%, of a calcium aluminoferrite phase of a composition corresponding to the general formula $C_2A_xF_{(1-x)}$, wherein X is from 0.2 to 0.8;
from 10 to 35%, of a calcium sulfoaluminous phase <<ye'elimite>> ($C_4A_3\$$),
from 40 to 75% of belite ($C_2S$),
from 0.01 to 10% of one or more minor phases selected from calcium sulphates, alkali sulphates, perovskite, gehlenite, free lime and periclase, and/or a vitreous phase,
and for which the total of the percentages of these phases is greater than or equal to 97%.

Belite is a well known mineralogical phase for the person skilled in the art which, in the pure state, has the composition $Ca_2SiO_4$ but which may also contain impurities.

The <<ye'elimite>> phase is a mineralogical phase which, in the pure state, has the composition $Ca_4Al_6SO_{16}$ but which may also contain impurities.

The aluminoferrite phase is a mineralogical phase which, in the pure state, has the formula $C_2A_xF_{(1-x)}$, wherein X is from 0.2 to 0.8 but which may also contain impurities.

Impurities are to be understood as any element of the Periodic Table of Elements.

Advantageously, the total of the percentages of the said phases of the BCSAF clinker is greater than or equal to 97%, preferably greater than or equal to 98%, more preferably greater than or equal to 99%, most preferably greater than or equal to 100%.

Preferably the mineralogical phases of the BCSAF clinker of the composition according to the invention further comprise one or more secondary elements selected from magnesium, sodium, potassium, boron, phosphorus, zinc, manganese, titanium, fluorine, chlorine.

Preferably the composition according to the invention comprises from 5 to 95% of a Portland clinker or of a Portland cement, more preferably from 8 to 90%, most preferably from 10 to 85%, % by mass relative to the total mass of the composition.

Preferably, the suitable Portland clinker or the suitable Portland cement according to the invention comprises a Portland clinker or Portland cement of the type CEM I, CEM II, CEM III, Cem IV or CEM V.

Preferably, the composition according to the invention comprises from 95 to 5% of a BCSAF clinker, more preferably from 92 to 10%, most preferably from 90 to 15%, % by mass relative to the total mass of the composition.

Preferably, the composition according to the invention comprises a Belite-Calcium-Sulphoaluminate-Ferrite clinker (BCSAF) comprising at least, in % expressed by mass relative to the total mass of BCSAF clinker in the composition
  from 10 to 25%, of a calcium aluminoferrite phase of a composition corresponding to the general formula $C_2A_xF_{(1-x)}$, wherein X is from 0.2 to 0.8;
  from 15 to 30%, of a calcium sulfoaluminate phase <<ye'elimite>> ($C_4A_3\$$),
  from 45 to 70% of belite ($C_2S$),
  from 0.01 to 10% of one or more minor phases selected from calcium sulphates, alkali sulphates, perovskite, gehlenite, free lime and periclase, and/or a vitreous phase,
  and for which the total of the percentages of these phases is greater than or equal to 97%.

More preferably, the composition according to the invention comprises a Belite-Calcium-Sulphoaluminate-Ferrite clinker (BCSAF) comprising, in % expressed by mass relative to the total mass of BCSAF clinker in the composition, at least
  from 15 to 25%, of a calcium aluminoferrite phase of a composition corresponding to the general formula $C_2A_xF_{(1-x)}$, wherein X is from 0.2 to 0.8;
  from 20 to 30%, of a calcium sulfoaluminate phase <<ye'elimite>> ($C_4A_3\$$),
  from 45 to 60% of belite ($C_2S$),
  from 0.01 to 10% of one or more minor phases selected from calcium sulphates, alkali sulphates, perovskite, gehlenite, free lime and periclase, and/or a vitreous phase,
  and for which the total of the percentages of these phases is greater than or equal to 97%
  and in that the mineralogical phases of the BCSAF clinker comprise one or more secondary elements selected from magnesium, sodium, potassium, boron, phosphorus, zinc, manganese, titanium, fluorine, chlorine.

The mineralogical phases of the BCSAF clinker of the composition according to the invention may comprise as major elements: calcium, aluminium, silica, iron, oxygen and sulphur.

The BCSAF clinker of the composition according to the invention may comprise at least the following main oxides present in relative proportions, % expressed by mass relative to the total mass of BCSAF clinker:
CaO: 45 to 61%
Al2O3: 8 to 22%
SiO2: 15 to 25%
Fe2O3: 3 to 15%
$SO_3$: 2 to 10%.

The mineralogical phases of the BCSAF clinker of the composition according to the invention may comprise one or more secondary elements, in % expressed by mass relative to the total mass of BCSAF clinker in the composition, selected from magnesium, sodium, potassium, boron, phosphorus, zinc, manganese, titanium, fluorine, chlorine, preferably present in the following quantities:
  from 0 to 5% of magnesium expressed as magnesium oxide,
  from 0 to 5% of sodium expressed as sodium oxide,
  from 0 to 5% of potassium expressed as potassium oxide,
  from 0 to 3% of boron expressed as boron oxide,
  from 0 to 7% of phosphorus expressed as phosphoric anhydride,
  from 0 to 5% of zinc, manganese, titanium or mixture thereof, expressed as oxides of these elements,
  from 0 to 3% of fluoride, chloride, or mixtures thereof, expressed as calcium fluoride and calcium chloride,
the total content of the said secondary elements being less than or equal to 15%.

The mineralogical phases of the BCSAF clinker of the composition according to the invention may preferably comprise, in % expressed by mass relative to the total mass of BCSAF clinker in the composition, the following secondary elements:
  from 1 to 4% of magnesium expressed as magnesium oxide,
  from 0.1 to 2% of sodium expressed as sodium oxide,
  from 0.1 to 2% of potassium expressed as potassium oxide,
  from 0 to 2% of boron expressed as boron oxide,
  from 0 to 4% of phosphorus expressed as phosphoric anhydride,
  from 0 to 3% of zinc, manganese, titanium or mixtures thereof, expressed as oxides of these elements,
  from 0 to 1% of fluoride, chloride, or mixture thereof, expressed as calcium fluoride and calcium chloride.

The mineralogical phases of the BCSAF clinker of the composition according to the invention may preferably comprise, in % expressed by mass relative to the total mass of BCSAF clinker in the composition, the following secondary elements:
  from 0.2 to 1.5% of sodium expressed as sodium oxide,
  from 0.2 to 1.5% of potassium expressed as potassium oxide,
  from 0.2 to 2% of boron expressed as boron oxide,
  from 0 to 1% of fluoride plus chloride, or mixture thereof, expressed as calcium fluoride and calcium chloride.

Preferably, the mineralogical phases of the BCSAF clinker of the composition according to the invention may comprise, in % expressed by mass relative to the total mass of BCSAF clinker in the composition, the following secondary elements:
  from 0.2 to 2% of boron expressed as boron oxide;

from 0.1 to 2% of potassium expressed as potassium oxide.

According to another preferred embodiment, the mineralogical phases of the BCSAF clinker of the composition according to the invention may comprise, in % expressed by mass relative to the total mass of BCSAF clinker in the composition, the following secondary elements:

from 0.2 to 2% of boron expressed as boron oxide;
from 0.1 to 2% of sodium expressed as sodium oxide.

According to another preferred embodiment, the mineralogical phases of the BCSAF clinker of the composition according to the invention may comprise, in % expressed by mass relative to the total mass of BCSAF clinker in the composition, the following secondary element:

from 0.2 to 2% of boron expressed as boron oxide.

According to another preferred embodiment, the mineralogical phases of the BCSAF clinker of the composition according to the invention may comprise, in expressed by mass relative to the total mass of BCSAF clinker in the composition, the following secondary elements:

from 0.2 to 2% of potassium expressed as potassium oxide;
from 0.5 to 4% of phosphorus expressed as phosphorus oxide ($P_2O_5$).

According to another preferred embodiment, the mineralogical phases of the BCSAF clinker of the composition according to the invention may comprise, in % expressed by mass relative to the total mass of BCSAF clinker in the composition, the following secondary elements:

from 0.2 to 2% of potassium expressed as potassium oxide;
from 0.5 to 4% of phosphorus expressed as phosphorus oxide ($P_2O_5$);
less than 0.1% of boron expressed as boron oxide.

According to a variant of the invention, the BCSAF clinker according to the invention does not comprise borax, or boron or compounds comprising boron.

Preferably, the composition according to the invention comprises sodium and potassium as secondary elements.

Preferably, the BCSAF clinker of the composition according to the invention does not comprise a mineralogical phase $C_3S$.

Another aspect of the invention is to provide a production process of a composition according to the invention comprising a step of putting in contact a Portland clinker or a Portland cement and a BCSAF clinker. This production process of a composition according to the invention may optionally comprise a step of grinding and/or homogenisation.

The Belite-Calcium-Sulphoaluminate-Ferrite clinker (BCSAF) of the composition according to the invention may be obtained according to the process described in patent application WO 2006/018569 or the BCSAF clinker may be the same as the one described in patent application WO 2006/018569.

The BCSAF clinker of the composition according to the invention may be made according to other processes, in particular in the following manner:

a) preparing a raw meal comprising a raw material or a mix of raw materials, able, by clinkerisation, to provide the phases $C_2A_xF_{(1-x)}$, wherein X is from 0.2 to 0.8, phase $C_4A_3\$$, and phase $C_2S$ in the required proportions;

b) adding and mixing into the raw mix obtained in step a) at least one additive supplying a secondary element selected from magnesium, sodium, potassium, boron, phosphorus, zinc, manganese, titanium, fluorine, chlorine, or mixtures thereof, in quantities calculated so that, after clinkerisation, the corresponding quantity of secondary elements, expressed as indicated above, is less than or equal to 20% by mass relative to the total mass of the clinker; and c) calcining the mix obtained in step b) at a temperature of 1150° C. to 1400° C., preferably from 1200° C. to 1325° C., for at least 15 minutes in an atmosphere which is sufficiently oxidising to avoid the calcium sulphate from being reduced to sulphur dioxide.

Preferably suitable raw materials to carry out step a) are:
a source of silica, for example a sand, a clay, a marl, fly ash, coal combustion ash, a pozzolan, silica fume; the source of silica may come from quarries or be the result of an industrial process;
a source of calcium for example limestone, marl, fly ash, coal combustion ash, pozzolans, calcined household residue; the source of calcium may come from quarries or be the result of an industrial process;
a source of alumina for example a clay, a marl, fly ash, coal combustion ash, a pozzolan, a bauxite, an alumina red mud, in particular an alumina mud coming from industrial waste during the extraction of the alumina, laterites, anorthosites, albites, feldspars; the source of alumina may come from quarries or be the result of an industrial process;
a source of iron for example iron oxide, laterites, steel industry slag, iron ore; the source of iron may come from quarries or be the result of an industrial process;
a source of calcium sulphate for example gypsum, calcium sulphate hemihydrate (α or β), or anhydrous calcium sulphate; the suitable sources of calcium sulphate according to the invention may come from quarries or be the result of an industrial process.

The preparation of the raw meal in step a) may be carried out by mixing the raw materials. The raw materials may be mixed in step a) by putting in contact, optionally comprising a step of grinding and/or homogenisation. Preferably, the raw materials of step a) are optionally dried before step a) or optionally calcined before step a).

The raw materials may be added in sequences, either in the main input of the kiln, and/or in other inputs of the kiln.

Furthermore, the combustion residue may also be integrated in the kiln.

The suitable raw materials to carry out step b) are:
a source of boron for example borax, boric acid, colemanite or all other compounds containing boron; the source of boron may come from quarries or be the result of an industrial process;
a source of magnesium for example a magnesium salt;
a source of sodium for example a sodium salt;
a source of potassium for example a potassium salt;
a source of phosphorus for example a phosphorus salt;
a source of zinc for example a zinc oxide;
a source of manganese for example a manganese oxide;
a source of titanium for example a titanium oxide;
a source of fluorine for example fluorine salts;
a source of chlorine for example chlorine salts;
or mixtures thereof.

The suitable raw materials to carry out step b) are either in the form of powder, or semi-liquid, or liquid or solid.

Step c) is a calcining step, which means according to the invention a burning step. The term «calcination» is to be understood according to the invention as the reaction between the chemical elements of step b) which leads to the formation of the mineralogical phases of the BCSAF clinker. This step may be carried out in a conventional cement plant kiln (for example a rotary kiln) or in another type of kiln (for example a continuous kiln).

Preferably, the calcination takes place for a minimum of 20 minutes, more preferably for a minimum of 30 minutes, most preferably for a minimum of 45 minutes.

The term <<sufficiently oxidising atmosphere>> is to be understood as, for example, the atmosphere, but other sufficiently oxidising atmospheres may be suitable.

The invention also relates to a cement comprising at least a composition according to the invention and described hereinabove; and
from 1 to 40% of calcium sulphate, % by mass relative to the total mass of cement.

Preferably, the cement according to the invention comprises 5 to 30%, more preferably 5 to 15% of calcium sulphate, most preferably 3 to 10% of calcium sulphate, % by mass relative to the total mass of cement.

The suitable calcium sulphate according to the invention is preferably gypsum, calcium sulphate hemihydrate (α or β), or anhydrous calcium sulphate. The suitable calcium sulphates according to the invention may come from quarries or be the result of an industrial process.

The cement according to the invention may be obtained by co-grinding of the composition according to the invention with the adequate amount of gypsum or other forms of calcium sulphate, determined by tests or calculations.

According to a variant of the invention, mineral additions may be added to the cement according to the invention. The cement according to the invention may further comprise 5 to 70% of mineral additions, more preferably 10 to 60%, most preferably 10 to 50%, % by mass relative to the total mass of cement. The addition of mineral additions may be carried out by homogenisation or by co-grinding.

According to a variant of the invention, the cement according to the invention may be obtained by co-grinding of the composition according to the invention with the adequate amount of gypsum or other forms of calcium sulphate, determined by tests or calculations and with the adequate amount of mineral additions.

Preferably, the cement according to the invention comprises 10 to 70% of mineral additions.

According to a preferred embodiment, the cement according to the invention may comprise at least mineral additions selected from slags (as defined in the <<Cement>> NF EN 197-1 Standard, paragraph 5.2.2), steel industry slags, pozzolanic materials (as defined in the <<Cement>> NF EN 197-1 Standard, paragraph 5.2.3), fly ash (as defined in the <<Cement>> NF EN 197-1 Standard, paragraph 5.2.4), or limestones (as defined in the <<Cement>> NF EN 197-1 Standard, paragraph 5.2.6), or mixtures thereof.

The invention also relates to a concrete comprising at least a cement according to the invention.

The invention also relates to a process for the preparation of a concrete according to the invention comprising a step of mixing a cement according to the invention with aggregates, water, optionally additives and optionally mineral additions.

The invention also relates to elements for the construction field made using the concrete according to the invention or the cement according to the invention.

The following examples illustrate the invention without restricting its scope.

EXAMPLES

Materials:
Portland cement (hereafter called OPC):
BCSAF clinker obtained from limestone, kaolinite clay, calcium sulphate, iron oxide the chemical compositions of which are given in Table I below and expressed in % by mass relative to the total mass:

TABLE I

| Composition by | Limestone | Kaolinite clay | Bauxite | Anhydrite (anhydrous calcium sulphate) | Iron oxide |
|---|---|---|---|---|---|
| Tot. SiO2. | 0.12 | 47.76 | 6.88 | 0.36 | 1.89 |
| Al2O3 | 0.14 | 35.36 | 85.11 | 0.18 | 0.00 |
| Fe2O3 | 0.09 | 1.34 | 1.85 | 0.12 | 95.30 |
| CaO | 55.34 | 0.73 | 0.46 | 40.80 | 0.00 |
| MgO | 0.19 | 0.27 | 0.18 | 0.00 | 0.03 |
| SO3 | 0.03 | 0.05 | 0.00 | 56.84 | 0.00 |
| Loss on ignition | 44.06 | 12.04 | 0.46 | 1.70 | 2.00 |
| P2O5 | 0.00 | 0.00 | 0.01 | 0.00 | 0.06 |
| TiO2 | 0.00 | 0.05 | 4.13 | 0.00 | 0.05 |
| Mn2O3 | 0.00 | 0.00 | 0.00 | 0.00 | 0.67 |
| Tot. K2O | 0.02 | 2.21 | 0.79 | 0.00 | 0.00 |
| Tot. Na2O | 0.01 | 0.19 | 0.13 | 0.00 | 0.00 |

Production of a BCSAF Clinker:
Preparation of the Raw Materials:
The raw materials were individually ground beforehand in order to verify the following characteristics:
0% reject at 200 μm
10% maximum reject at 100 μm.
Weighing, Mixing and Homogenisation of the Raw Materials:
Preparation of the raw meal according to step a) of the process according to the invention. The weighing was carried out according to the proportions defined below in Table II and expressed in % by mass relative to the total mass of the raw meal:

TABLE II

| % | Limestone | Kaolinite clay | Bauxite | Anhydrite | Iron oxide |
|---|---|---|---|---|---|
| BCSAF raw meal | 61.36 | 24.80 | 3.35 | 5.47 | 5.02 |

The mixing of these constituents was carried out after weighing the different products according to the following sequence:
rough manual mixing by shaking a plastic bag containing all the constituents;
passage in a jar mill for 4 hours with a mix: 2 Kg of material+2 Kg of demineralised water;
drying in a drying oven for one night at 110° C.;
introduction of 26.59 g of Borax for 1000 g of raw meal obtained in step a) and homogenisation by passage in a mixer of the Eirich type for 3 minutes.

Granulation:
After obtaining the raw meal conforming with step a) of the process according to the invention, the raw meal was submitted to a granulation operation in order to obtain sizes of granules of approximately 1 cm in diameter.

Burning:
Detail of the procedure followed for the burning of BCSAF clinkers:
4 crucibles filled with 1 kg of the raw meal conforming with step a) of the process according to the invention;
introduction of 4 full crucibles (i.e. approximately 4×250 g of raw meal) in the oven without a cover;
rise in temperature according to a temperature ramp n°1: 1000° C./h up to 975° C.
plateau at 975° C. for 1 hour;
covers put on the crucibles;
temperature ramp N°2: 300° C./h up to 1350° plateau at 1350° C. for 30 minutes, then the crucibles were emptied; the granules were left to cool in the atmosphere.

A BCSAF clinker was obtained.

Production of a Cement According to the Invention:

A cement according to the invention was made by mixing 26 to 27% of previously-obtained clinker, 60 to 70% OPC and 3 to 4% of calcium sulphate, by mass % relative to the total mass of the binder. The proportions defined herein below in Table III give the proportions of the binders made according to the invention, expressed in % by mass relative to the total mass of the binder.

| Binders  | OPC in % | BCSAF in % | CaSO$_4$ in % |
|----------|----------|------------|---------------|
| Binder 1 | 70       | 27         | 3             |
| Binder 2 | 60       | 26         | 4             |

Table III

Production of a Mortar According to the Invention:

The mortar was made according to the EN 196-1 Standard.
Quantities of materials used to make a mortar:
450 g binder
1350 g standardized sand
225 g water For the preparation of the binder, all the materials were mixed using a Turbula mixer for 30 minutes then the mixing procedure respected the EN196-1 Standard. The mortar was then poured into steel moulds, then these moulds were placed in a cabinet at controlled hygrometry (>97%). After one day of hydration of the mortar, the prisms of mortar were demoulded and immersed in water at 20° C. until the breaking date.

The compressive mechanical strengths measured at 28 days according to the EN 196-1 Standard are given in the table below.

|          | Mechanical Strength in MPa measured at 28 days for a standardized mortar |
|----------|--------------------------------------------------------------------------|
| Binder 1 | 43 |
| Binder 2 | 39 |
| OPC 52.5 | 53 |
| OPC 42.5 | 45 |

The invention claimed is:

1. A composition comprising at least, in % expressed by mass relative to the total mass of the composition
   from 1 to 99% of a Portland clinker or Portland cement; and
   from 99 to 1% of a Belite-Calcium-Sulphoaluminate-Ferrite clinker (BCSAF) comprising at least, in % expressed by mass relative to the total mass of BCSAF clinker
      from 5 to 30%, of a calcium aluminoferrite phase of a composition corresponding to the general formula $C_2A_xF_{(1-x)}$,
      wherein X is from 0.2 to 0.8;
      from 10 to 35%, of a calcium sulfoaluminate phase <<ye'elimite>> ($C_4A_3\$$),
      from 40 to 75% of belite phase ($C_2S$),
      from 0.01 to 10% of one or more minor phases selected from calcium sulphates, alkali sulphates, perovskite, gehlenite, free lime and periclase, and/or a vitreous phase,
   and for which the total of the percentages of said phases is greater than or equal to 97%.

2. The composition according to claim 1, wherein the BCSAF clinker includes mineral phases that further comprise one or more secondary elements selected from the group consisting of magnesium, sodium, potassium, boron, phosphorus, zinc, manganese, titanium, fluorine, and chlorine.

3. The composition according to claim 1, comprising 5 to 95% of a Portland clinker or a Portland cement, % by mass relative to the total mass of the composition.

4. The composition according to claim 1, comprising 95 to 5% of a BCSAF clinker, % by mass relative to the total mass of the composition.

5. The composition according to claim 1, wherein the Belite-Calcium-Sulphoaluminate-Ferrite clinker (BCSAF) comprises at least, in % expressed by mass relative to the total mass of BCSAF clinker in the composition
   from 10 to 25% of a calcium aluminoferrite phase of a composition corresponding to the general formula $C_2A_xF_{(1-x)}$, wherein X is from 0.2 to 0.8,
   from 15 to 30% of a calcium sulfoaluminate phase <<ye'elimit>> ($C_4A_3\$$),
   from 45 to 70% of belite phase ($C_2S$),
   from 0.01 to 10% of one or more minor phases selected from calcium sulphates, alkali sulphates, perovskite, gehlenite, free lime and periclase, and/or a vitreous phase,
   and for which the total of the percentages of said phases is greater than or equal to 97%.

6. The composition according to claim 1, comprising, in % expressed by mass relative to the total mass of BCSAF clinker in the composition, the following secondary elements:
   from 0.2 to 1.5% of sodium expressed as sodium oxide,
   from 0.2 to 1.5% of potassium expressed as potassium oxide,
   from 0.2 to 2% of boron expressed as boron oxide,
   from 0 to 1% of fluoride plus chloride, or mixture thereof, expressed as calcium fluoride and calcium chloride.

7. The composition according to claim 1, comprising, in % expressed by mass relative to the total mass of BCSAF clinker in the composition, the following secondary elements:
   from 0.2 to 2% of boron expressed as boron oxide;
   from 0.1 to 2% of potassium expressed as potassium oxide.

8. The composition according to claim 1, comprising, in % expressed by mass relative to the total mass of BCSAF clinker in the composition, the following secondary elements:
   from 0.2 to 2% of potassium expressed as potassium oxide;
   from 0.5 to 4% of phosphorus expressed as phosphorus oxide ($P_2O_5$).

9. The composition according to claim 1, wherein the Belite-Calcium-Sulphoaluminate-Ferrite clinker (BCSAF) does not comprise a mineralogical phase $C_3S$.

10. The composition according to claim 3, comprising 8 to 90% of a Portland clinker or a Portland cement, % by mass relative to the total mass of the, composition.

11. The composition according to claim 10, comprising 10 to 85% of a Portland clinker or a Portland cement, % by mass relative to the total mass of the composition.

12. The composition according to claim 4, comprising 92 to 10% of a BCSAF clinker, % by mass relative to the total mass of the composition.

13. The composition according to claim 12, comprising 90 to 15% of a BCSAF clinker, % by mass relative to the total mass of the composition.

14. A process for the production of a composition according to claim 1 comprising mixing a Portland clinker or a Portland cement and a BCSAF clinker.

15. The process according to claim 14, wherein the mixing comprises grinding, or homogenizing or both the Portland clinker or the Portland cement and the BCSAF clinker.

16. A cement comprising at least
a composition according to claim 1; and
from 1 to 40% of calcium sulphate, % by mass relative to the total mass of cement.

17. The cement according to claim 16, further comprising 5 to 70% of mineral additions, % by mass relative to the total mass of cement.

18. A concrete comprising at least a cement according to claim 16.

19. A process for the preparation of a concrete according to claim 18, comprising mixing a cement with aggregates, water, optionally additives, and optionally mineral additions.

20. An element for the construction field made using with the concrete according to claim 18.

21. An element for the construction field with the cement according to claim 16.

* * * * *